United States Patent [19]

Kincheloe

[11] 4,364,791

[45] Dec. 21, 1982

[54] SPLICER ASSEMBLY FOR A TAPE CASSETTE LOADER

[75] Inventor: David W. Kincheloe, West Chicago, Ill.

[73] Assignee: King Instrument Corporation, Westboro, Mass.

[21] Appl. No.: 183,472

[22] Filed: Sep. 2, 1980

[51] Int. Cl.³ .................... B31F 5/06; G03D 15/04
[52] U.S. Cl. .................................. 156/506; 156/518; 156/520; 242/58.1; 242/58.5
[58] Field of Search ............... 156/506, 505, 530, 518, 156/520, 502; 242/58.1, 58.5

[56] References Cited

U.S. PATENT DOCUMENTS

| | | | |
|---|---|---|---|
| 2,523,389 | 9/1950 | Oskow | 156/530 |
| 3,634,171 | 1/1972 | Rosborough, Jr. et al. | 156/506 |
| 3,753,835 | 8/1973 | King | 156/518 |
| 3,929,552 | 12/1975 | Bettenhausen et al. | 156/530 |
| 4,052,247 | 10/1977 | Rothrock | 156/506 |
| 4,264,402 | 4/1981 | Morgan | 156/506 |

Primary Examiner—Michael G. Wityshyn
Attorney, Agent, or Firm—Schiller & Pandiscio

[57] ABSTRACT

A tape cassette loader having a cutting system for cutting a strip of splicing tape for application to a magnetic tape junction during a tape splicing operation. A cutting blade carried by a movable tape applicator is driven past a stationary window member through which the splicing tape is fed, for cutting the splicing tape by action of the cutting blade against a cutting edge formed in the window. The cutting blade is rotatably mounted to the tape applicator and biased outwardly therefrom for holding the blade against the window member for properly cutting the splicing tape. As the tape applicator travels subjacent to the window member, the cutting blade is rotated through an arcuate path beneath the window member; the cutting edge of the movable blade is rotated to a position for preventing cutting of the magnetic tape and a pressure surface of the blade is simultaneously carried into a position for pressing against the splicing tape during application of the same to the magnetic tape junction.

An air cylinder is utilized to drive the tape applicator through the cutting operation and onto the magnetic tape for applying a pressure force against the magnetic tape to properly seal the splicing tape across the tape junction. A pair of springs working in conjunction with the air force powering the air cylinder provides a controlled pressure during splicing tape application.

10 Claims, 5 Drawing Figures

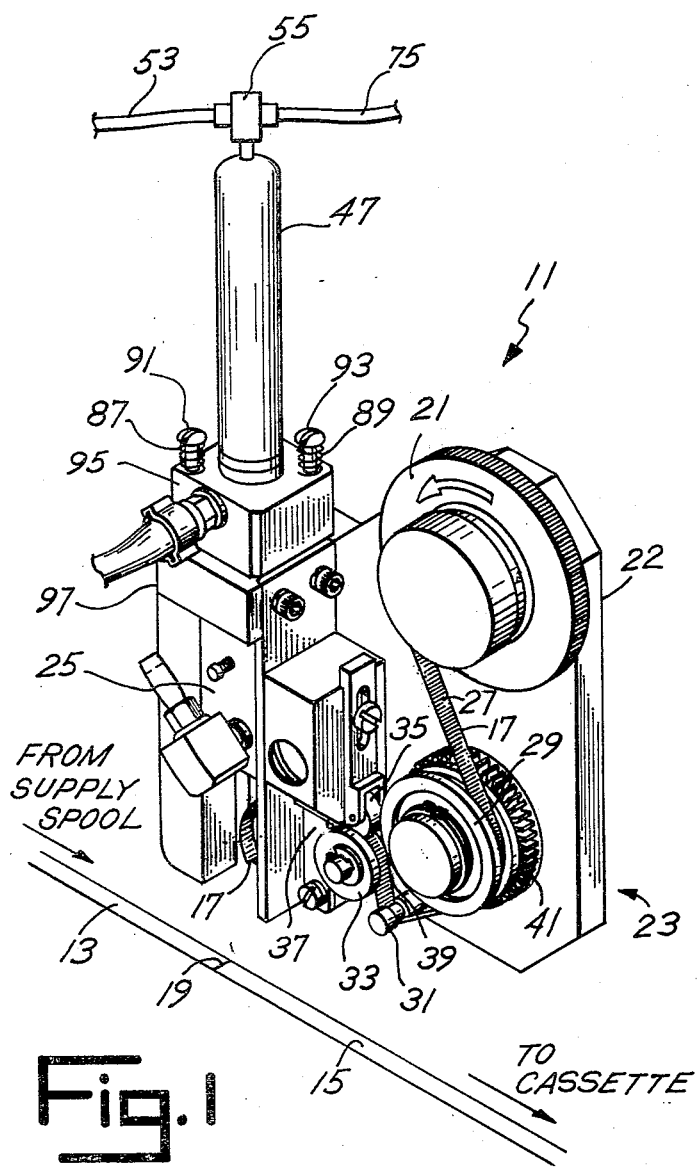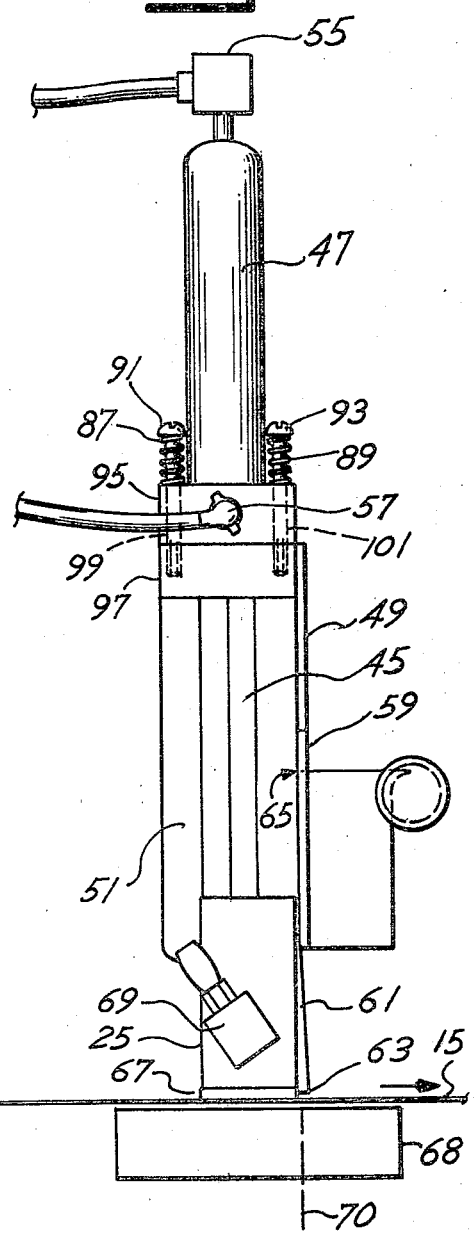

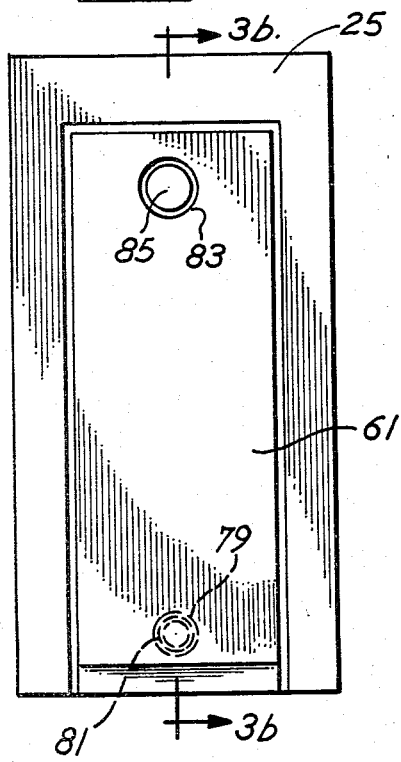
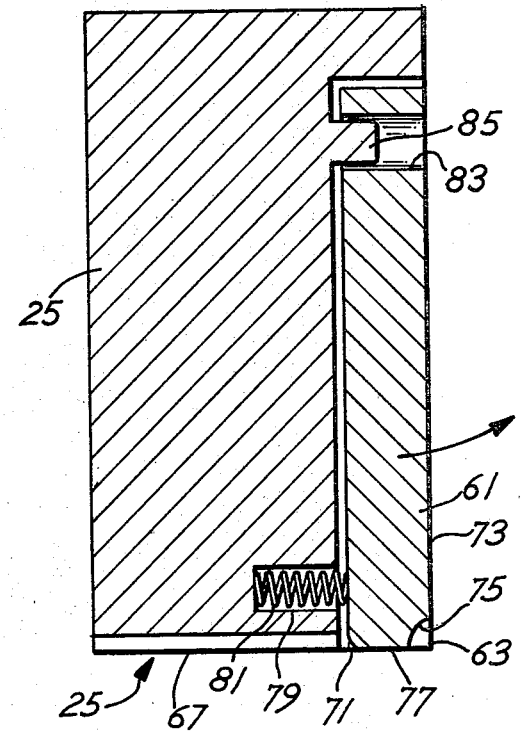
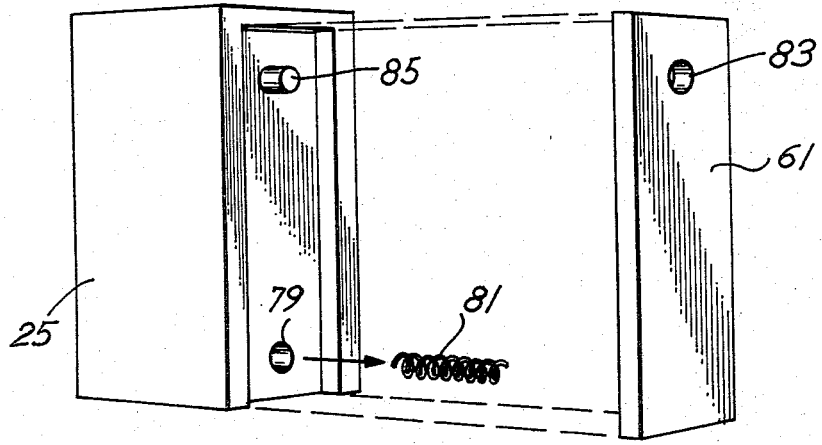

1

SPLICER ASSEMBLY FOR A TAPE CASSETTE LOADER

BACKGROUND OF THE INVENTION

The invention relates to a tape splicing apparatus for use in a tape cassette loader, and more particularly relates to an improved apparatus for providing proper pressure application during splicing tape securement to a magnetic tape junction.

In a tape cassette loader, a predetermined length of magnetic tape is paid out from a spool, spliced between a tape leader and loaded within a tape cassette. Such cassette loaders include a splicer assembly in which a strip of splicing tape is cut from a roll and then applied to the magnetic tape junction for splicing the same during the process of loading the cassette. See for example, U.S. Pat. No. 3,753,835 issued to James L. King on Aug. 21, 1973, which is assigned to King Instrument Corporation of Waltham, Massachusetts and/or Westboro, Massachusetts which manufactures tape cassette loaders, Model 750, 760, 770, which utilize a splicer assembly. Reference is made to the service manuals on these King machines which provide background information of the splicer assembly. The present invention is an improvement on the splicer assembly of the aforesaid patent.

A tape cassette loader requires a unique tape splicer assembly which splice tape automatically and at an extremely high rate of speed. The splicer includes a movable flat blade air driven along the face of a window member through which the splicing tape is fed, for cutting a strip of splicing tape by action of the moving blade and a cutting surface defining the lower boundary of the window of the window member. Splicing tape is fed through the window by a ratchet controlled feed roller system.

During the application of the strip of splicing tape to the magnetic tape junction, a tape applicator to which the movable blade is mounted carries the strip of splicing tape and applies the same onto the junction with sufficient pressure to secure the splicing tape properly onto the surface of the magnetic recording tape. However, if too much pressure is applied by the tape applicator, the movable cutting blade may be driven too hard against the magnetic tape cutting the same. Also, if insufficient pressure is applied by the tape applicator, the strip of splicing tape may not be properly secured down onto the magnetic tape junction.

Thus, it would be highly desirable to provide a system which applies a proper pressure for sealing a strip of splicing tape across a magnetic tape junction.

It is therefore an object of the present invention to provide a new and improved apparatus for dispensing and applying splicing tape.

Another object of the present invention is to provide a new and improved tape splicing mechanism for use in a magnetic tape cassette loader.

A more specific object of the present invention is to provide apparatus for feeding, severing, and applying the splicing tape to a magnetic tape junction.

SUMMARY OF THE INVENTION

These and other objects of the invention are achieved by providing a movable cutting blade pivotally mounted with respect to a tape applicator from which the movable blade is biased against a guide structure for properly cutting dispensed splicing tape during a downward motion of the tape applicator; thereafter the blade is rotated outwardly during splicing tape application for moving the cutting edge of the blade out of position for preventing magnetic tape cutting and for moving a pressure surface carried by the blade into position for application against the splicing tape during splicing tape application.

Also, these and other objects of the invention are achieved by utilizing two different pressure forces during the tape splicing procedure; one of which for moving the applicator during cutting of the splicing tape and the other of which for applying a controlled pressure during splicing tape application across the magnetic junction to be spliced.

BRIEF DESCRIPTION OF THE DRAWING

In the following Description Of The Preferred Embodiment, reference is made to the accompanying drawing. This drawing consists of four figures, briefly described as follows:

FIG. 1 is a perspective view of the preferred embodiment of the present invention with its tape applicator in a raised position;

FIG. 2 is a side elevation view of a portion of the preferred embodiment, with the tape applicator in a lowered position;

FIG. 3a is a front elevation view of the tape applicator of the preferred embodiment;

FIG. 3b is a cross-section view of the tape applicator of the preferred embodiment, taken along line 3b—3b of FIG. 3a; and FIG. 4 is an exploded view of the tape applicator of the preferred embodiment.

DESCRIPTION OF THE PREFERRED EMBODIMENT

Referring to FIG. 1, a splicer assembly 11 automatically splices the leading edge of a magnetic tape 13 to the front portion of a cassette leader tape 15 by applying a strip of splicing tape 17 across the magnetic tape/leader junction 19. Once spliced, the magnetic tape is wound into a tape cassette (not shown) at a high rate of speed; thereafter, the magnetic tape is cut and spliced to the rear portion of the leader tape (not shown) and the final spliced portion is wound into the cassette. The cassette is ejected and an empty cassette is moved into position for loading of another length of magnetic tape which is being supplied from a supply spool (not shown).

A roll 21 of splicing tape 17 is rotatably mounted to a backing plate 22, for tape payout by operation of a payout assembly 23 for presenting a length of splicing tape beneath a movable tape applicator 25. The length of splicing tape presented beneath applicator 25 is cut from the web of splicing tape by movement of the applicator down toward magnetic tape 13. One side 27 of the splicing tape carries an adhesive coating for fixing the splicing tape across junction 19, securely holding the magnetic tape to the leader tape.

Payout assembly 23 includes a toothed guide roll 29, a tape guide pin 31, a brass feed roll 33, a pressure roller 35 and a tape picker 37. As shown, the non-adhesive side of splicing tape 17 rides against guide roll 29 and guide pin 31, and the adhesive side of splicing tape 17 rides in a grooved channel 39 of brass roll 33. Pressure roller 35 serves to keep the splicing tape in place on the brass roll and provides a positive feed to the tape. Tape picker 37 strips the splicing tape from brass roll 33 and guides the tape through a window and beneath applicator 25. Tape picker 37 may be teflon coated to resist adhesive buildup and wear.

Guide roll 29 is geared for movement with feed roll 33 by gear teeth 41 carried by the guide roll 29 and by gear teeth (not shown) carried by feed roll 33. The guide roll is turned by a ratchet mechanism (not shown) which is turned a fixed increment between successive cuttings of the splicing tape.

Referring to FIG. 2, tape applicator 25 is connected to a piston rod 45 of an air cylinder 47, for movement between a stationary cutter blade 49 and a guide member 51. Air enters an input port 55 for passage into air cylinder 47 for extending piston rod 45. The piston rod is driven back into cylinder 47 by passing air into an input port 57.

A window 59 formed in stationary cutter blade 49 permits the splicing tape to pass through the cutter blade and beneath applicator 25 when applicator 25 is in its raised postion, shown in FIG. 1. Applicator 25 caries a cutting blade 61 having a cutting edge 63 for meeting with a cutting edge 65 formed in the lower surface of window 59.

A pressure pad 67 formed of rubber or other cushioning like material is positioned at the end of applicator 25 for pressing the cut length of splicing tape across the tape-leader junction. Pressure pad 67 presses the strip of splicing tape and the magnetic tape down against a splicing block 68, upon which the magnetic tape and leader tape are held by suction. A plurality of vacuum holes (not shown) pass through pad 67 from a vacuum fitting 69 housed in the applicator. The vacuum holes are used to hold the cut length of splicing tape in place against pad 67 during splicing tape application. Vacuum is applied via fitting 69 during movement of the applicator against the magnetic tape and then the vacuum is released after splicing.

As shown in FIG. 2, blade 61 rotates outwardly from applicator 25 when the applicator is driven to its extended position against the magnetic tape. Stationary cutter blade 49 is disposed in a fixed relationship with the tape leaving a distance between the stationary cutter blade and the magnetic tape for permitting movement of cutter blade 61 through the vertical plane 70 which defines the inside surface of stationary cutter blade 49.

As shown more particularly in FIG. 3, the bottom portion of cutter blade 61 includes a single cutting edge 63 and a blunt edge 71. Cutting edge 63 meshes with the window cutting edge 65 for cutting the splicing tape as edge 63 moves along the flat inside surface of stationary cutter blade 49. The outside surface 73 of blade 61 forms an abtuse angle 75 of slightly greater than 90° with the bottom surface 77 of blade 61.

A hollowed out opening 79 is included in applicator 25 for housing a coiled spring 81. Spring 81 rests within opening 79 and biases blade 61 outwardly away from applicator 25 at the lower end of the blade. At the upper end of the blade an opening 83 is formed in the blade for receiving a cylindrical lug 85 held by applicator 25 (see FIG. 4). Sufficient play between lug 85 and the walls of opening 83 is provided to permit a small rotation of blade 61 relative to applicator 25, as described previously, when the applicator is in its extended position.

When the applicator is in its retracted upper position, spring 81 biases the cutting edge 63 against the stationary cutter blade 49 for performing the cutting of the splicing tape as the applicator is driven along guide member 51. As blade 61 moves subjacent to stationary cutter blade 49, blade 61 is permitted to rotate beneath stationary blade 49. Cutting edge 63 is rotated to a position for preventing cutting of the magnetic tape and blunt edge 71 is simultaneously carried into a position to serve as a pressure surface for pressing the splicing tape onto the magnetic tape junction.

As shown in FIGS. 1 and 2, a pair of springs 87, 89 encompass a pair of screws 91, 93, respectively. The screws pass through a first mounting block 95 and are threaded into a second mounting block 97 such that screws 91, 93 are fixed relative to block 97. Block 95 is movable along screws 91, 93 via a pair of cylindrical openings 99, 101 passing through block 95.

Air cylinder 47 is rigidly fixed to the top of block 95 for driving piston 45 relative to block 95. As the piston presses tape applicator 25 against the magnetic tape and splicing block 68, the air force provided by cylinder 47 raises block 95 off of block 97. Springs 87, 89 provide a restraining force to the movement of block 95 such that a certain pressure is applied by applicator 25 against the magnetic tape and splicing block 68, due to the restraining force of springs 87, 89. The screws 91, 93 may be turned into and out of block 97 in order to vary the tension of springs 87, 89 to manually adjust the pressure applied by applicator 25 to the magnetic tape.

In operation, the entire splicer assembly 11 remains stationary. Tape applicator 25 is air driven downward between guide member 51 and stationary cutter blade 49 to cut a strip of splicing tape. The strip is held in place on pad 67 by vacuum as applicator 25 continues moving downward, and the strip is pressed over the junction 19. After the splice is made, the vacuum is released from the applicator pad and the applicator is driven to its up position. After the applicator has moved upward, the guide roll 29 may be rotated for feeding a length of tape through window 59.

It should be understood, of course, that foregoing is a description of a single embodiment and that modifications or alterations may be made to the described embodiment without departing from the spirit or scope of the appended claims.

What is claimed is:

1. For use in a high-speed cassette loader, a magnetic tape splicer assembly for splicing a magnetic tape junction with a strip of splicing tape, said splicer assembly comprising in combination:

a tape applicator slidably mounted relative to a magnetic tape junction to be spliced, said applicator including means for carrying a strip of splicing tape and applying the same across the junction as said applicator is moved into close relationship with the tape junction;

guideway means for guiding said applicator into relationship with the junction in order to press the strip of splicing tape across the junction;

a first cutter blade positioned on one side of said applicator and having a first cutting edge, said first cutter blade spaced a distance above the tape junction;

a second cutter blade including a second cutting edge and a blunt edge at one end thereof;

means pivotally mounting said second cutter blade to said applicator so that said second cutter blade confronts said first cutter blade and said one end of said blade may be moved away from said applicator;

means for feeding a length of a web of splicing tape between said first and second cutting edges;

biasing means maintaining said second cutter blade against said first cutter blade as said applicator is moved along said first cutter blade and rotating said one end of said second cutter blade away from said applicator as said applicator moves subjacent to said first cutter blade so as to (a) move said blunt edge of said second cutter blade into a position wherein said blunt edge may contact said magnetic tape and (b) simultaneously move said second cutting edge of said second cutter blade to a position to prevent contact of said second cutting edge with the magnetic tape when said applicator is moved into close relationship with said tape junction.

2. A tape splicer assembly according to claim 1 wherein said first cutter blade is held stationary relative to the tape junction.

3. A tape splicer assembly according to claim 2 wherein said first cutter includes a tape receiving window for receiving said length of splicing tape, and wherein said first cutting edge defines a portion of said window.

4. A tape splicer assembly according to claim 3 wherein said first cutter blade has a flat surface passing through the plane of said window, along which the second cutting edge of said second cutter blade is slid.

5. A tape splicer assembly according to claim 4 wherein said flat surface ends at a location spaced from the tape junction a sufficient distance to permit said second cutter blade to rotate into the plane of said flat surface prior to application of splicing tape to the junction.

6. A tape splicer assembly according to claim 1 wherein said biasing means includes a spring member located for biasing said second cutter blade about a point of rotation, relative to said tape applicator.

7. A tape splicer assembly according to claim 1 and further including a cutting position located along said guideway means, from which said tape applicator is slid for cutting said splicing tape; and means for retracting said tape applicator subsequent to a tape splicing operation.

8. A tape splicer assembly according to claim 7 wherein said feed means feeds a length of splicing tape after said tape applicator is retracted to its cutting position.

9. A tape splicer according to claim 1 and further including:
air drive means for driving said tape applicator toward the tape junction with a certain amount of driving force; and
means for modifying said driving force to a lesser force during application of said strip of splicing tape across the junction by said tape applicator.

10. A splicer assembly according to claim 9 and further including a moveable member, and wherein said drive means applies said driving force to said tape applicator relative to said moveable member; and wherein said means for modifying said force includes means providing a restraining force to counteract movement of said moveable member, said restraining force being less than said driving force; and wherein said moveable member moves against said restraining force by application of said driving force to said tape applicator during application of splicing tape to the tape junction.

* * * * *